(12) United States Patent
Landwehr (10) Patent No.: US 7,498,683 B2
(45) Date of Patent: Mar. 3, 2009

(54) DEVICE FOR CONVERTING FLOW ENERGY INTO ELECTRICAL ENERGY

(76) Inventor: Wilhelm Landwehr, Goingener Str. 9, Wilhelmshaven (DE) 26300

( * ) Notice: Subject to any disclaimer, the term of this patent is extended or adjusted under 35 U.S.C. 154(b) by 0 days.

(21) Appl. No.: 10/931,799

(22) Filed: Sep. 1, 2004

(65) Prior Publication Data

US 2006/0055174 A1  Mar. 16, 2006

(51) Int. Cl.
   *F03B 13/00*  (2006.01)
   *F16F 9/06*  (2006.01)
   *F16H 55/17*  (2006.01)

(52) U.S. Cl. .................. 290/43; 74/412 R; 74/434; 290/44; 290/55

(58) Field of Classification Search .................. 290/43, 290/44; 74/380, 381, 412 R, 413, 414, 421 R, 74/37, 89.2; 474/72, 23, 7, 148, 152, 156
   See application file for complete search history.

(56) References Cited

U.S. PATENT DOCUMENTS

| | | | | |
|---|---|---|---|---|
| 2,376,020 A | * | 5/1945 | Victoria | 290/44 |
| 3,806,733 A | * | 4/1974 | Haanen | 290/55 |
| 4,613,760 A | * | 9/1986 | Law | 290/1 C |
| 4,871,923 A | * | 10/1989 | Scholz et al. | 290/55 |
| 6,157,088 A | * | 12/2000 | Bendix | 290/55 |

\* cited by examiner

*Primary Examiner*—Richard W L Ridley
*Assistant Examiner*—Justin Krause
(74) *Attorney, Agent, or Firm*—RatnerPrestia (57) ABSTRACT

A device for converting flow energy of a fluid into electrical energy, said device comprising:
  h) a rotor (1) which can be driven by the fluid and comprises rotor shaft (2),
  i) an electric generator (16, 17) comprising a generator shaft (6),
  j) a gear system comprising a gear shaft (4; 4') for transferring a rotational movement of the rotor shaft (2) to the generator shaft (6),
  k) a support structure (30),
  l) a carrier structure (20) which forms a rotor bearing (2*a*) for the rotor shaft (2), a gear bearing (4*a;* 60) for the gear shaft (4; 4') and a generator bearing (6*a*) for the generator shaft (6);
  m) and an adjusting bearing (40; 75) which adjustably bears the carrier structure (20) relative to the support structure (30);
  n) wherein at least one of the gear shaft (4; 4') and the generator shaft (6) is arranged lower than the adjusting bearing (40; 75).

45 Claims, 7 Drawing Sheets

DEVICE FOR CONVERTING FLOW ENERGY INTO ELECTRICAL ENERGY

The invention relates to a device for converting flow energy of a fluid into electrical energy. The invention can be used in particular in wind energy plants, tidal power stations, and other plants for obtaining energy from the flow energy of fluid currents whose flow direction can change.

Such devices generally comprise a rotor, which is driven by the fluid current, and an electric generator driven by the rotor. If the energy of a free, undirected flow such as, for example, wind or a tidal flow is being converted, a rapid exchange of the induction partners in the generator has to be ensured despite the low flow velocity of the fluid. In the case of a slowly running rotor, either the generator exhibits a large diameter with a correspondingly large number of induction partners, or a gear system is used which converts the low rotor speed into the required high speed of a smaller generator. Plants of the latter design are preferably used for wind energy plants. Depending on the size and configuration of the plant, the rotor rotates at a speed of about 10 to 20 revolutions per minute. The output which the rotor takes from the wind is introduced into a gear system via the rotor shaft. The gear system converts the rotor speed and the rotor torque into the input speed and the input torque of the generator. Generator speeds of 1000 to 3000 revolutions per minute are common.

The bearing of the rotor shaft, the gear system, the generator, and other parts of the plant such as the power converter and cooling units are mounted as separate constructional units on a machine carrier which is generally embodied as a framework construction in a casting or welding construction. The machine carrier is a joint element of an adjusting joint which permits rotational movement about the vertical axis of the tower of the wind energy plant. It is connected by a joint to the upper end of the tower in the way described. Because it is mounted on the machine carrier, the rotor can be orientated to the wind if the wind direction changes. The tower introduces the wind forces and the other operating forces into the base via a foundation. Since these forces are directed into the tower via the adjusting joint, the adjusting joint is exposed to significant stresses.

Because all of the energy-converting components are mounted on the machine carrier, wind energy plants of this design exhibit a relatively high plant weight above the adjusting joint. Often, components of the gear system or the generator can only be exchanged or repaired by dismantling the complete constructional unit in each case. Due to the large masses of the constructional units and the large altitude of their site of installation, exchanging them is time and cost intensive.

It is an object of the invention to reduce the stress on the adjusting joint.

It is also an object of the invention to facilitate the erection of a device for converting fluid flow energy into electrical energy and to reduce the operating costs caused by maintenance and repairs.

A device for converting flow energy of a fluid into electrical energy, according to an exemplary embodiment of the invention comprises: a rotor which can be rotary driven by the fluid and comprises a rotor shaft; an electric generator comprising a generator shaft; and a gear system comprising a gear shaft through which a rotational movement of the rotor shaft is transferred onto the generator shaft. The gear system can be in one stage, with just a single gear shaft. In preferred embodiments, it is in multiple stages, with a number of gear shafts which transfer the rotational movement of the rotor shaft from an input shaft of the gear system onto an output shaft of the gear system, preferably via at least one intermediate shaft, and from the output shaft of the gear system onto the generator shaft. The device further comprises a support structure and a carrier structure. The rotor is supported on the support structure via the carrier structure. In the case of a wind energy plant, for example, the support structure forms the tower of the plant, an upper part of the tower or merely a bearing part which is fixedly attached in or to the upper part of the tower and can itself consist of a number of separately attached structures. The carrier structure supports the rotor shaft, the generator shaft, and the gear shaft; in the case of a gear system in multiple stages, the carrier structure preferably supports all of the gear shafts. Accordingly, it forms a rotor bearing, a gear bearing, and a generator bearing, wherein the bearing per shaft is to be understood as preferably the number of bearing points in each case. The carrier structure can be adjusted relative to the support structure in order to be able to adjust the rotor relative to the fluid flow, in particular in order to be able to optimally orientate the rotor when the flow direction changes, for the purpose of maximizing the energy yield. For this purpose, the carrier structure and the support structure form an adjusting joint with each other, that is, they each form a joint element of the adjusting joint. In the adjusting joint, the rotor is adjusted relative to the support structure. An adjusting movement is a rotational or pivoting movement of the rotor about an adjusting axis which should be exactly or at least substantially perpendicular to the rotational axis of the rotor and in this sense transverse to the rotational axis; preferably, it points radially with respect to the rotational axis of the rotor. The adjusting joint can in particular be a rotational joint, the joint axis of which forms the adjusting axis. In principle, another movement can also be superimposed onto the rotational or pivoting movement about the adjusting axis, if for example, the adjusting joint is formed as a cam joint. The adjusting axis is preferably co-linear with a central longitudinal axis of the support structure. The adjusting axis should coincide with the direction of the gravitational force or should at least have such a directional component. In the case of a wind energy plant, the adjusting axis should point parallel or preferably co-linear to the longitudinal axis of the tower.

The device further comprises an adjusting bearing which adjustably supports the carrier structure relative to the support structure. The carrier structure and the support structure can directly form the adjusting bearing themselves, for example, as a sliding bearing between these two structures or as a roll bearing comprising one or more running paths formed by one of the carrier structure and the support structure and a number of roll bodies which are rotatably supported on bearing trunnions or in bearing shells of the other of the carrier structure and the support structure. It is also possible to form the adjusting bearing directly between the carrier structure and the support structure, as a combination of a sliding bearing and a roll bearing. In alternative embodiments, running paths and roll bodies which are guided and held by the running paths and roll off on the running paths form the adjusting bearing, wherein the running paths or merely a part of the running paths can be directly formed by the carrier structure and/or the support structure. If the roll bodies are guided and held by running paths, that is, by at least two opposing running paths facing each other, these at least two running paths can also be formed by bearing elements, for which the carrier structure and the support structure form the corresponding seating surfaces. Such a separate roll bearing can be fastened to (e.g., screwed onto) one of the carrier structure and the support structure or preferably to both, each by means of a flange connection.

In the adjusting joint, the adjusting bearing introduces the operating forces of the device and the weight force of the carrier structure, including the components supported by it, into the support structure. The operating forces are substantially composed of the rotor force acting along the rotor shaft and the forces which cause reaction load moments with respect to the operating moments of the rotor, the gear system, and the generator. In the typical applications of the invention, in particular in wind energy plants, these forces act transversely to the weight force.

In accordance with the invention, at least one of the gear shaft and the generator shaft is arranged lower than the adjusting bearing. If the adjusting bearing is formed from a number of separate bearings, the at least one of the gear shaft and the generator shaft is at least arranged lower than an uppermost bearing of such a parted adjusting bearing.

In a first embodiment, the joint element and its bearing are formed in the adjusting joint such that the weight of the carrier structure, including the components supported by it, is supported on a first bearing, preferably an axial bearing formed about the adjusting axis, and the operating forces are supported in a second bearing, preferably a radial bearing formed about the adjusting axis. The axial bearing and the radial bearing are preferably separate bearings, wherein the radial bearing supporting the operating forces is preferably formed nearer to the rotor shaft than the axial bearing. In order to minimize the tilting moment, it is advantageously arranged along the adjusting axis as near as possible to the rotor shaft. The two bearings can in particular be rotational bearings, preferably with the same rotational axis.

In a second embodiment, the axial bearing and the radial bearing are subsumed in a combined axial-radial bearing, and the arrangement in accordance with the invention relates to the adjusting bearing formed in such a combined way.

The gear shaft or at least a part of preferably the number of gear shafts and preferably also the generator shaft is/are preferably arranged lower than the radial bearing in the case of the separate bearings of the adjusting joint, and lower than the axial-radial bearing in the case of the combined bearing, in order to obtain a load moment based on weight force with respect to the tilting moment in the adjusting bearing in question of the adjusting joint. It is particularly advantageous if the center of gravity of the carrier structure, including the components supported by it, is formed lower than the radial bearing or the combined axial-radial bearing of the adjusting joint. The weight of the rotor is not taken into account here, although such a position of the center of gravity, including the rotor weight, is particularly preferred.

The at least one of the gear shaft and the generator shaft is preferably arranged lower than the adjusting bearing such that the at least one of the gear shaft and the generator shaft is arranged beneath the adjusting bearing. The center of gravity, as defined above, is preferably also formed beneath the adjusting bearing. In this way, the stresses on the adjusting bearing are further reduced. In the case of the adjusting bearing formed as a rotational bearing, this means that a surface enclosed by the rotational bearing at least partly overlaps the at least one of the gear shaft and the generator shaft or the center of gravity, as viewed in a vertical projection.

In principle, however, it is also advantageous if the at least one of the gear shaft and the generator shaft is arranged lower than the adjusting bearing, but is arranged next to the adjusting bearing as viewed in a vertical top view. Thus, it is advantageous if the carrier structure forms a side projection facing away from the rotor, the projection generating a load moment with respect to the tilting moment originating from the rotor weight. In developments, the carrier structure also supports other components of the energy-generating plant, for example, a power converter, control means, and cooling means. These other components are advantageously arranged on the side of the carrier structure extended in this way which opposes the rotor over the adjusting axis, in order to at least partly compensate for the weight of the rotor. These components should be arranged approximately level with the gear system which is preferably arranged beneath the rotor shaft, such that the height of the plant formed with the device is at least substantially determined only by the rotor shaft.

In preferred embodiments, a number of shafts supported by the carrier structure—preferably all the shafts supported by the carrier structure—are arranged side by side at least substantially parallel to each other along an adjusting axis of the adjusting joint, wherein these shafts point transversely—preferably, at right angles—to the adjusting axis. The rotational axes of the shafts in question can intersect the adjusting axis. In order to save on constructional height—or more generally speaking, constructional length measured along the adjusting axis—the shafts or some of the shafts can be arranged on both sides of the adjusting axis, preferably alternately, such that the gear wheels borne by the shafts or constituting the shafts form a zigzag set of gears or at least a meandering set.

In accordance with another aspect of the invention, the carrier structure comprises a carrier unit which is formed in one piece or pre-assembled from a number of structural parts, that is, consisting of structural parts which are jointed and fixedly connected to each other, and forms at least two of the following functional components: the joint element of the carrier structure, the gear bearing, the rotor bearing and the generator bearing. The pre-assembled carrier unit is assembled before forming the shaft bearing or the number of shaft bearings. The bearing surface or number of bearing surfaces per shaft bearing and/or the bearing surface or number of bearing surfaces of the joint element are formed on the already assembled carrier unit. The hitherto separate housing is omitted for the at least one shaft supported by the carrier unit. The gear system has hitherto been supported in a gear housing of its own, and the gear housing fastened on the machine carrier forming the joint element. The shaft bearing formed in accordance with the invention, by contrast, is from the start orientated relative to the joint element and/or the at least one other shaft bearing formed by the carrier unit such as operation of the device requires. By mounting the shaft in or on the shaft bearing of the carrier unit provided for the shaft in question, the shaft is already orientated relative to the joint element and/or the at least one other shaft bearing formed by the carrier unit.

If, as is preferred, the joint element and gear bearing—or, in the case of a gear system in multiple stages, the number of gear bearings—are provided in the carrier unit in accordance with the invention, then a separate gear housing is omitted, whereby weight can be saved. Furthermore, no gear housing has to be mounted in an exact fit on a machine carrier. The gear shaft or number of gear shafts is/are directly orientated in an exact fit as they are supported on or in the carrier unit. An assembly step is thus saved. The same applies analogously if the carrier unit in accordance with the invention supports the rotor shaft and/or the generator shaft. In the preferred case of supporting a number of shafts, supporting by the common carrier unit further results in a reduction in wear, since inaccuracies in the orientation of the shafts relative to each other, as hitherto caused by assembling the separate housings, can no longer occur. If the carrier unit supports a number of shafts, for example, one or more gear shafts and preferably also the rotor shaft, then the advantage is achieved for each of the shafts.

In preferred embodiments, the carrier unit in accordance with the invention forms: the joint element of the adjusting joint which serves to adjust the rotor; the rotor bearing; and the gear bearing or bearings. Even more preferably, the carrier unit also forms the generator bearing. Such an arrangement provides the greatest savings in weight by omitting separate bearing housings. Furthermore, such embodiments promise the greatest orientation accuracy for the shafts between the individual functional units of the rotor, gear system, and generator. Wear is accordingly at its lowest in the gear system.

The generator can in particular be suspended beneath the joint element formed by the carrier structure. This enables the generator to be lowered in order to be exchanged, for example, in a tower of a wind energy plant, by means of a hoist, for example, a winch, permanently or temporarily attached to the carrier structure. When the generator is supported above a base of the carrier structure formed by the joint element, an opening can be provided in the base through which the generator can be lowered.

A carrier unit formed in one piece can in particular be a metallic cast piece, that is, the carrier unit together with all its structural sub-components can be obtained in one piece by casting. The carrier unit can also be formed from a number of cast pieces and/or pieces formed suitably in other ways, which are jointed together and fixedly connected to each other, for example, by a welding connection, screw connection, or other suitable jointing and connecting methods, which can also be used in combination. If the carrier unit supports one or more gear shafts, a gear carrier of the carrier unit can in particular be formed in one piece as a cast part. In the pre-jointed carrier unit or the carrier unit formed in one piece as a whole, the sub-structures of the carrier unit are sufficiently fixedly connected to each other so that the surfaces required for providing the bearings can be created, that is, machined or only then worked out at all, preferably metal-cut, on the existing structural unit. With respect to the orientation of the individual bearings to each other, it is particularly advantageous if the carrier unit does not have to be re-clamped in order to be machined, but rather all the bearing surfaces are created in a single clamp.

A method for producing the pre-jointed carrier structure comprises the following steps: forming at least two sub-structures; jointing and connecting the at least two sub-structures to a carrier unit which is rigid in its own right; creating bearing surfaces in or on the carrier unit for at least two of the following components: the joint element, the gear bearing, the rotor bearing, and the generator bearing. The at least two sub-structures can in particular be connected to each other in a material lock. The carrier unit is preferably machined in order to create the at least two of the joint element, the gear bearing, the rotor bearing and the generator bearing. A receptacle—and in the receptacle, the bearing surface or surfaces—can be created in the carrier unit for at least one of the rotor bearing, the gear bearing and the generator bearing. The bearing surface can instead also be created on a carrier trunnion. The carrier trunnion can have been or can be fastened, secure against rotation, to the carrier unit before creating or after having created the bearing surface.

The carrier structure, or if provided, preferably the carrier unit, can form a shaft bearing through a projecting, fixed axial trunnion, on which the shaft in question is rotatably supported. Alternatively, the carrier structure can form a receptacle or a number of receptacles for the shaft or number of shafts supported by it, the shaft or shafts protruding into the receptacle or receptacles. Preferably, a number of bearing points are formed on the trunnion or trunnions or in the receptacle or receptacles along the longitudinal direction of the shaft in each case, for forming the shaft bearing in each case. Preferably, the carrier unit forms, for each shaft supported by it, a receptacle of its own, such that the shaft in question can be individually mounted and dismantled. Although the bearing point or preferably the number of bearing points per shaft can be formed directly or indirectly by a sliding bearing, for example, by a sliding bush between the shaft in question and the carrier structure, it is preferred if at least one roll bearing is provided per bearing point, in the receptacle or as applicable on an axial trunnion for the shaft. As applicable, one roll bearing per shaft can be provided on a bearing point and a sliding bearing can be provided directly or indirectly on another bearing point, between the shaft and the carrier structure. The carrier structure provides the bearing seat for the roll bearing in each case.

It is also possible to individually receive the shafts which bear gear wheels in bearing units, such as, for example, pillow block bearings or flange bearings. If a pre-mounted carrier unit forms the shaft bearing or bearings, then the bearing units in each case, which are each formed as an insert or crown, are preferably components of the pre-mounted carrier unit. In such a case, the carrier unit forms the seat for the insert or crown in question.

In order to make exchanging gear wheels easier, the gear wheels are preferably overhung on the gear shaft or number of gear shafts. When exchanging a gear wheel, no other gear wheels have to be dismantled, or at least only those which obstruct direct access to the gear wheel provided for exchanging, either because they are sat on the same shaft or because they partly cover the gear which is to be removed.

In preferred embodiments, a number of the gear wheels, preferably all of the gear wheels, are arranged on the same side of a gear carrier of the carrier structure. The gear wheels in question can advantageously be arranged in a common gear space which the carrier structure—preferably, the carrier unit—forms. Arranging the gear wheels in the gear space facilitates inspection. The gear wheels arranged in the gear space should be able to be dismantled via the gear space and taken from their shaft or trunnion into the gear space and assembled in the reverse order. The gear space is advantageously sufficiently large that the required maintenance and repair work can be performed in it. It is preferably man-sized.

The gear system comprises a cylindrical gear system. It preferably comprises only cylindrical gears which are in engagement with each other, each in pairs, or via a traction mechanism, that is, in this embodiment, the gear system is a purely cylindrical gear system. Preferably, all of the cylindrical gears meshing with another gear are arranged external to their respective meshing partner. The cylindrical gear system can only consist of toothed gears. As applicable, the forces can also be transferred via friction gears. Alternatively, the cylindrical gear system can also consist of one or more chain or belt drives. In preferred embodiments, one or more toothed gear pairings are combined with a belt drive or as applicable a number of belt drives. Toothed belts are preferred as belts. In particular, the gear shaft of a single stage gear system or the output shaft of the preferably multiple stage gear system can drive off onto the generator shaft by means of a belt, preferably a toothed belt. Meshing gears of the gear system are preferably spur gears.

The toothed gears are advantageously lubricated using circulatory lubrication comprising an oil sump in a common gear space which is preferably formed as described above. It is advantageous to encapsulate within the gear space the toothed gears which mate with each other, each in pairs, or subsumed into suitable groups of toothed gears, and to supply each with an adapted lubricant.

It is particularly advantageous to encapsulate the gear bearing or the number of gear bearings. It is also advantageous to encapsulate the rotor bearing and/or the generator bearing. Encapsulating enables the shaft bearing in question to be supplied with a lubricant adapted to the operating conditions of the shaft bearing in each case. Encapsulating also prevents abrasion input from the gear wheels. The shaft bearings or a number—as applicable, only one—of the shaft bearings is/are thus advantageously separated fluidically from the gear wheels. Each of the shaft bearings can be fluidically separated from the other shaft bearings for the purpose of individually supplying lubricant. A group of shaft bearings, for example, the gear bearings, can also be subsumed by a common lubricant supply but fluidically separated from the other shaft bearings.

The adjusting bearing can comprise roll bodies, preferably rollers, and a running path for the roll bodies. The roll bodies are rotatably fastened to the support structure or more preferably rotatably fastened to the carrier structure. The other structure in each case forms the running path, on which the roll bodies are supported during the adjusting movement of the rotor.

It is advantageous if the roll bodies are attached to the carrier structure or the support structure such that they can be adjusted towards the opposing running path and in the opposite direction. In particular, adjusting the roll bodies—which is preferably individually possible for each roll body—enables production tolerances between the support structure and the carrier structure to be compensated for. It makes assembling and disassembling the carrier structure easier. An adjusting means for a roll body is preferably embodied as a pivoting arm which can be pivoted about a pivoting axis which is preferably parallel to the adjusting axis. The force required for pressing the roll bodies onto the running path is preferably generated mechanically. However, it is also conceivable to generate it fluidically, in particular hydraulically, or electrically. If the carrier unit does not already form the carrier structure by itself, the rollers or the running path of the bearing in each case are preferably provided on the carrier unit.

The pivoting arms can in particular be rockers. As an alternative to rockers, the roll bodies can also be made adjustable with respect to the running path by supporting the rollers on eccentric trunnions which are rotatably supported in corresponding receptacles on the carrier structure or supporting structure. By rotating the trunnions in their receptacles, the rollers are moved away from the running path or pressed onto the running path.

A damping is preferably provided in the roll body/running path bearing, in order to reduce the transfer of structure-borne noise. The damping can in particular be achieved by accordingly forming the roll bodies. Thus, the roll bodies can each be provided with a circumferential, rubber-elastic buckstay which is elastically deformed at the contact point with the running path by the pressure force of the adjusting and pressing means. Advantageously, the damping member is formed within the roll body in each case, for example, as an intermediate layer between a hard inner sleeve or shaft and a hard outer sleeve of the roll body formed in each case as a roller. The rubber-elastic element preferably exhibits significant damping, in order to stop the device from bracing under load impulses. Furthermore, using rubber-elastic elements homogenises the load distribution between the individual roll bodies of a bearing.

Since, in the first embodiment, the carrier structure in the adjusting joint rests on the support structure in an adjusting bearing and is supported in another adjusting bearing against tilting moments originating from the operating forces, the carrier structure together with the shaft or shafts supported by it can be particularly easily lowered into the support structure from above, until it rests on the bearing supporting the weight force. The entire carrier structure can extend over this bearing. Since no flange connections have to be created when placing the carrier structure, the assembly time is significantly shortened. When using roll bodies for the bearing absorbing the tilting moments, only the setting work required for pressing the rollers onto the running path has to be performed, once the carrier structure has been placed.

The adjusting joint can also be formed by one or more roll bearings which is/are identical in its/their essential design to common, axially and/or radially acting roll bearings. At least one running path of such a roll bearing is fixed to the carrier structure and at least one other running path is fixed to the support structure or is formed directly by the structure in question. The same applies to the running path or number of running paths of a combined roll bearing for receiving radial and axial loads. The embodiment of the bearing in the manner of known roll bearings, however, requires a higher accuracy of the connection geometries for the carrier structure and the support structure, in order for the bearing to function properly.

It is not in principle necessary to secure the carrier structure against lifting off from the bearing receiving the weight force, since the components of the operating forces directed against the weight force are as a rule significantly smaller than the weight force. If securing the carrier structure is nonetheless desired, this can also be realized in particular by roll bodies and a running path for the roll bodies.

Preferred embodiments of the invention are also described in the sub-claims.

Further features disclosed in connection with the inventive arrangement with respect to the adjusting bearing are also advantageous alone as such, that is, for a device in accordance with features a) to f) of claim 1. Separating the support for the weight force and the tilting moment in the adjusting joint, pre-jointing the carrier unit or forming the same in one piece, fluidically separating the lubrication of the shaft bearing(s) and the gear wheels, arranging the gear wheels in a common gear space, and/or supporting the carrier structure by means of adjustable roll bodies, that is, supporting the roll bodies on bearing trunnions or in bearing shells are, for example, advantageous in combination with features a) to f).

An examplary embodiment of the invention is explained below on the basis of figures. Features disclosed by the example embodiment, each individually and in a combination of features, advantageously develop the subjects of the claims and also the embodiments described above. There is shown:

Figure 1:
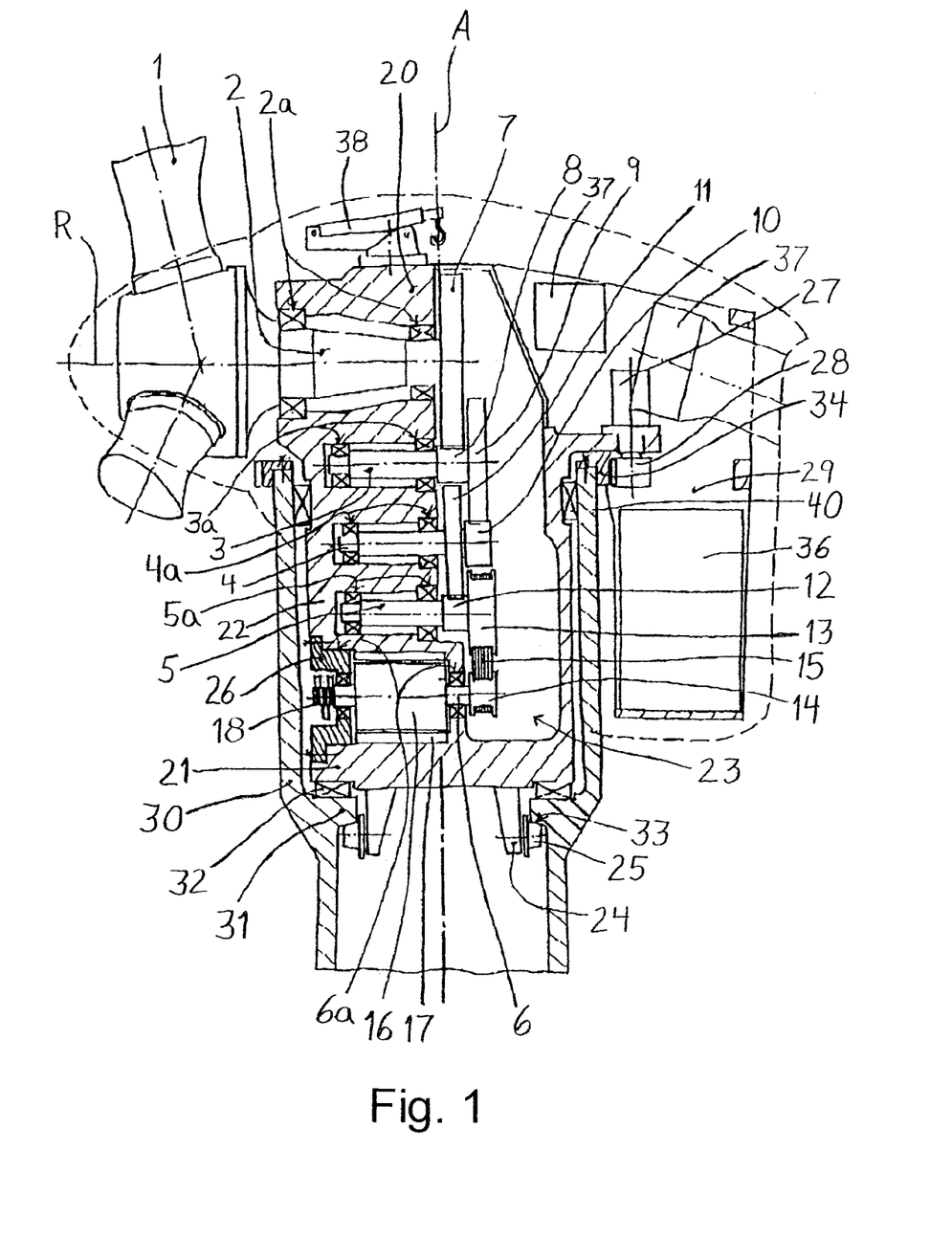
FIG. 1 a first embodiment of a device in accordance with the invention, using the example of a wind energy plant.

In a first embodiment, FIG. 1 shows a device for converting wind energy into electrical energy. It is the upper part of a wind energy plant. A rotor 1 of the device is indicated, consisting of a hub and three rotor blades fastened to the hub. The rotor 1 is connected, secure against rotation, to a rotor shaft 2, in the exemplary embodiment by means of a flange connection. The rotational movement of the rotor 1 is transferred, via a gear system comprising gear shafts 3, 4, and 5, onto a shaft trunnion 6 of an electric generator consisting of a generator rotor 16 which is connected, secure against rotation, to the shaft trunnion 6, and a stator 17. In addition to the gear shafts 3, 4, and 5, the gear system which transfers the rotational movement of the rotor 1 onto the generator shaft 6 comprises: a cylindrical gear 7, secure against rotation but overhung on the rotor shaft 2; two cylindrical gears 8 and 9, secure against rotation and overhung on the gear shaft 3; two cylindrical gears 10 and 11, secure against rotation and overhung on the gear shaft 4; two cylindrical gears 12 and 13, secure against rotation and overhung on the gear shaft 5; and a cylindrical gear 14, secure against rotation and overhung on the generator shaft 6. The cylindrical gears 7 to 12 are cylindrical toothed gears each with an outer toothing, which mate with each other, each in pairs, to transfer the torque. The cylindrical gears 13 and 14, together with a toothed belt 15, form a toothed belt output onto the generator shaft 6.

A carrier structure 20 supports the rotor shaft 2 such that it can rotate about the horizontal rotor axis R. For the rotational bearing, the carrier structure 20 forms two bearing points 2a which each form a bearing seat for a roll bearing. In this sense, the two bearing points 2a form the rotor bearing of the carrier structure 20.

The carrier structure 20 also supports all the gear shafts 3, 4, and 5 of the gear system. Each of the gear shafts 3-5 is rotatably supported about the rotational axis of the gear shaft 3, 4, and 5 in each case, in two bearing points 3a to 5a formed by the carrier structure 20, by means of roll bearings. The carrier structure 20 further forms two bearing points 6a for the generator rotor 16, that is, for its two facing-side shaft trunnions 6 which together form the generator shaft. A roll bearing for one shaft trunnion 6 is directly received in one of the two bearing points 6a. An insert 26 is inserted, in an exact fit, into the other bearing point 6a. The insert 26 receives another roll bearing for the bearing of the other shaft trunnion 6 of the generator rotor 16. The insert 26 is screwed to the carrier structure 20.

In order to be able to orientate the rotor 1 if the wind direction changes, the carrier structure 20 is supported on a support structure 30 such that it can rotate about an adjusting axis A. The support structure 30 can be formed directly by the upper part of the tower. Instead, it can also be an insert or crown which is inserted into the tower or placed onto the tower and fixedly connected to the tower. In the exemplary embodiment, it is formed by the tower and a number of inserts which are fixedly connected to the tower. The adjusting axis A points vertically and is a radial with respect to the rotor axis R. The carrier structure 20 and the support structure 30 form an adjusting joint with the adjusting axis A as the joint axis. The adjusting joint of the exemplary embodiment is accordingly a simple rotational joint. In the adjusting joint, the carrier structure 20 is axially supported on the support structure 30 via an axial rotational bearing 32 formed about the adjusting axis A. In the adjusting joint, the carrier structure 20 is radially supported on the support structure 30 by a radial rotational bearing 40 formed about the adjusting axis A. The carrier structure 20 is functionally sub-divided into sub-structures, substantially into a sub-structure 21 which forms the joint element of the carrier structure 20 and is referred to as such below, and a gear carrier 22 which supports the gear shafts 3, 4, and 5, the rotor shaft 2 and—in combination with the joint element 21—and the generator shaft 6. The joint element 21 forms a base of the carrier structure 20. The gear carrier 22 protrudes up from the joint element 21 on one side. The rotor shaft 2, the gear shafts 3, 4, and 5, and the generator shaft 6 are supported, axially parallel and side by side, in this order along the adjusting axis A, individually in a receptacle of the carrier structure 20 of its own. The shaft bearings 2a to 6a are formed in the receptacles. All the gear wheels 7-14 are arranged on the side of the gear carrier 22 opposite the rotor 1, as a single set of gears.

The joint element 21 and the gear carrier 22 are embodied as an integrated carrier unit which already exists as a structural unit when the shaft bearings 2a to 6a, the bearing point for the axial bearing 32 and the bearing point for the radial bearing 40 are created. In order to obtain the carrier unit 21, 22, the joint element 21 and the gear carrier 22 can in particular be cast in one piece as a metallic case piece. Alternatively, the joint element 21 and the gear carrier 22 can also be cast separately and jointing together and fixedly connected to each other before creating the shaft bearings 2a-6a and other bearing surfaces, preferably by means of a welding connection. In the latter case, the carrier unit comprising the joint element 21 and the gear carrier 22 is a pre-assembled or constructed part. In order to obtain a pre-assembled carrier unit 21, 22, joint element 21 and/or the gear carrier 22 can also each consist of a number of parts fixedly connected to each other. The joint element 21 fulfills the task of the machine carrier of conventional devices. By integrating the joint element 21 with the gear carrier 22 in accordance with the invention, space is saved by omitting the previously separate gear housing. By creating the bearing points in or on such a carrier unit 21, 22, the gear shafts 3, 4, and 5 can already be precisely orientated relative to the joint element 21—and in the exemplary embodiment, also relative to the shafts 2 and 6—when creating the gear bearings 3a-5a. When using a separate gear housing, by contrast, the gear shafts in the casing have to be orientated to each other in a first step and then by precisely mounting the casing on a separate machine carrier.

The gear bearings 3a-5a are fluidically separated from the gear wheels 7 to 14 by sealing their receptacles off to the gear space 23, whereby the gear bearings 3a-5a are encapsulated. In this way, it is possible to supply each of the gear bearings 3a-5a in its receptacle with a lubricant which is individually adapted to the operating conditions in each case. Furthermore, through fluidic separation, the abrasional output of the cylindrical gears 7 to 14 is kept away from the gear bearings 3a-5a. Preferably, the rotor bearing 2a and the generator bearing 6a are also fluidically separated from the gear wheels 7 to 14. This significantly increases the service life of the bearings 2a-6a.

As in the exemplary embodiment, the receptacles for the gear shafts 3-5 can be formed as pocket bores or in particular as through-bores.

A wall, which together with the gear carrier 22 surrounds a gear space 23, protrudes from the joint element 21 on the side opposite the gear carrier 22 with respect to the adjusting axis A. The shafts 2 to 6 protrude into the gear space 23, and all the gear wheels 7 to 14 are arranged in the gear space 23. The gear space 23 is man-sized, whereby the gear system can be easily and reliably inspected and parts of the gear system can be easily maintained and exchanged or repaired.

The toothed gears 7 to 12 of the gear system are lubricated using circulatory lubrication comprising an oil sump within the common gear space 23. If, as preferred, the toothed belt 15 is embodied such that the lubricant for the gear wheels 7 to 12 does not damage it, the cylindrical gears 13 and 14 can be included in the circulatory lubrication, which—when the generator 16, 17 is preferably arranged near the base—enables the oil sump to easily be formed on the base of the gear space 23.

The generator stator 17 comprising the field coils is held by the carrier unit 21, 22 of the carrier structure 20. The insert 26 seals the large opening in the carrier unit 21, 22 required for installing the stator 17 and furthermore bears a current collector 18 of the generator 16, 17. Since the carrier unit 21, 22 also supports the generator 16, 17, a separate gear housing can be omitted. In order to cool the generator 16, 17, cooling channels which surround the stator 17 are worked into the carrier unit 21, 22. A coolant flows through the cooling channels which conveys the absorbed heat to the ambience of the wind power plant via a cooling means 35.

The support structure 30 is sleeve-shaped and comprises the adjusting axis A as a central longitudinal axis. The support structure 30 is open at the top, such that the carrier structure 20 can be inserted and lowered into the support structure 30 from above. In order to axially support the weight of the carrier structure 20, a collar 31 circumferentially protrudes radially inward from a shell inner surface of the support structure 30. A surface encircling the adjusting axis A and pointing upwards of an annular insert fastened on the collar 31, forms a bearing surface of the axial bearing 32. The axial bearing 32 is formed as a roller bearing comprising a number of rollers rotatably fastened to the joint element 21 and a running path formed by the bearing surface of the collar 31, on which the rollers of the carrier structure 20 run off during adjusting movements of the carrier structure 20.

While the axial bearing 32 primarily supports the weight force originating from the weight of the carrier structure 20 and the components supported by it, the operating forces are primarily supported in the radial rotational bearing 40 which is formed about the adjusting axis A and is also formed between the carrier structure 20 and the support structure 30. The radial bearing 40 is formed in an end section of the support structure 30, as near as possible to the rotor axis R. The gear carrier 22 lies opposite this end section. Regarding the radial bearing 40, the gear carrier 22 is functionally a part of the joint element 21. The radial bearing 40 introduces the operating forces, such as wind loads and radial portions from moment forces, into the support structure 30. The radial bearing 40 does not take on any weight forces, at least not to any extent relevant in practice. The axial bearing 32 transfers the weight force on the one hand, but also simultaneously supports the carrier structure 20 against the support structure 30 when tilting moments occur.

For a motorized adjustment about the adjusting axis A, at least two electric or hydraulic adjusting motors 27 are preferably provided which are fastened to the carrier structure 20. A toothed gear 28 is fastened, secure against rotation, to each of the motor shafts of the motors 27. When rotary driven by the motors 27, the toothed gears 28 mate with the toothing of a toothed ring 34 fastened to the support structure 30. Due to the mating engagement, the toothed gears 28 roll off on the toothed ring 34, such that the drive movement of the motors 27 causes a rotational movement of the carrier structure 20 about the adjusting axis A. The carrier structure 20 forms a side projection 29 for fastening the motors 27. The motors 27 can be provided with braking means which prevent the carrier structure 20 from rotating undesirably relative to the support structure 30. Alternatively or additionally, it is also possible to provide a separate braking means between the carrier structure 20 and the support structure 30.

Furthermore, the support structure 30 also supports the cooling means 35, a control means 37 and electrical parts 36 of the plant. To this end, it is formed such that these other components of the plant are arranged on the side facing away from the rotor 1, that is, diametrically opposite the rotor 1 with respect to the adjusting axis A, outside the sleeve-shaped support structure 30. The other components of the plant and the side projection 29 of the carrier structure 20 which supports them therefore form a counterweight to the rotor 1 and reduce the mass-related tilting moments about a tilting axis which is orthogonal to the adjusting axis A and the rotor axis R.

Due to the various tasks of the carrier structure 20 and due to the demand for cost-effective construction, the carrier structure 20 as a whole is embodied as a pre-assembled carrier unit. The carrier structure 20 as a whole—that is, including: the joint element 21; the gear carrier 22 which simultaneously also forms a rotor carrier and, together with the joint element 21, a generator carrier; the wall opposite the gear carrier 22, which forms part of the gear space 23; and the side projection 29—can be embodied instead as a carrier unit which is cast as a cast piece. The carrier structure 20 as a whole is advantageously embodied as a pre-assembled carrier unit whose substructures are jointed together and fixedly connected to each other before creating the receptacles and bearing surfaces required for the various bearing tasks. A combination of welded groups and screwed assembly groups is preferred. The welded groups and screwed assembly groups preferably comprise both sheet steel parts and steel profiles and steel cast parts.

The device is fitted with a hoist 38 which can in particular be embodied as a crane comprising a winch means, as in the exemplary embodiment. The hoist 38 makes it easier to install and dismantle gear parts, by lifting them out of and into the gear space 23 and also holding them directly during mounting and dismantling. The hoist 38 can also be used to hold, lift, and lower other components of the plant. With a sufficiently long winch cord, it is even possible to lower components to be changed to the base of the tower of the wind energy plant or to lift them from the ground, preferably at a side of the tower. When not in use, the hoist 38 is accommodated in a casing which is fastened to the carrier structure 20. As an alternative to fixedly installing the hoist 38, it is also conceivable to temporarily attach it, only when needed.

In order to prevent the carrier structure 20 from moving vertically counter to the weight force, another roller bearing is formed on the side of the collar 31 opposite the axial bearing 32. In this case, too, a running path 33 encircling the adjusting axis A is provided on the collar 31. A number of rollers 25, rotatably fastened to the carrier structure 20, run off on the running path 33, are supported on a number of holders 24 of the carrier structure 20 which project downwards from the joint element 21, and grip behind the running path 33 as viewed, from the joint element 21. The rollers 25 are individually and detachably fastened to the holders 24.

Figure 2:
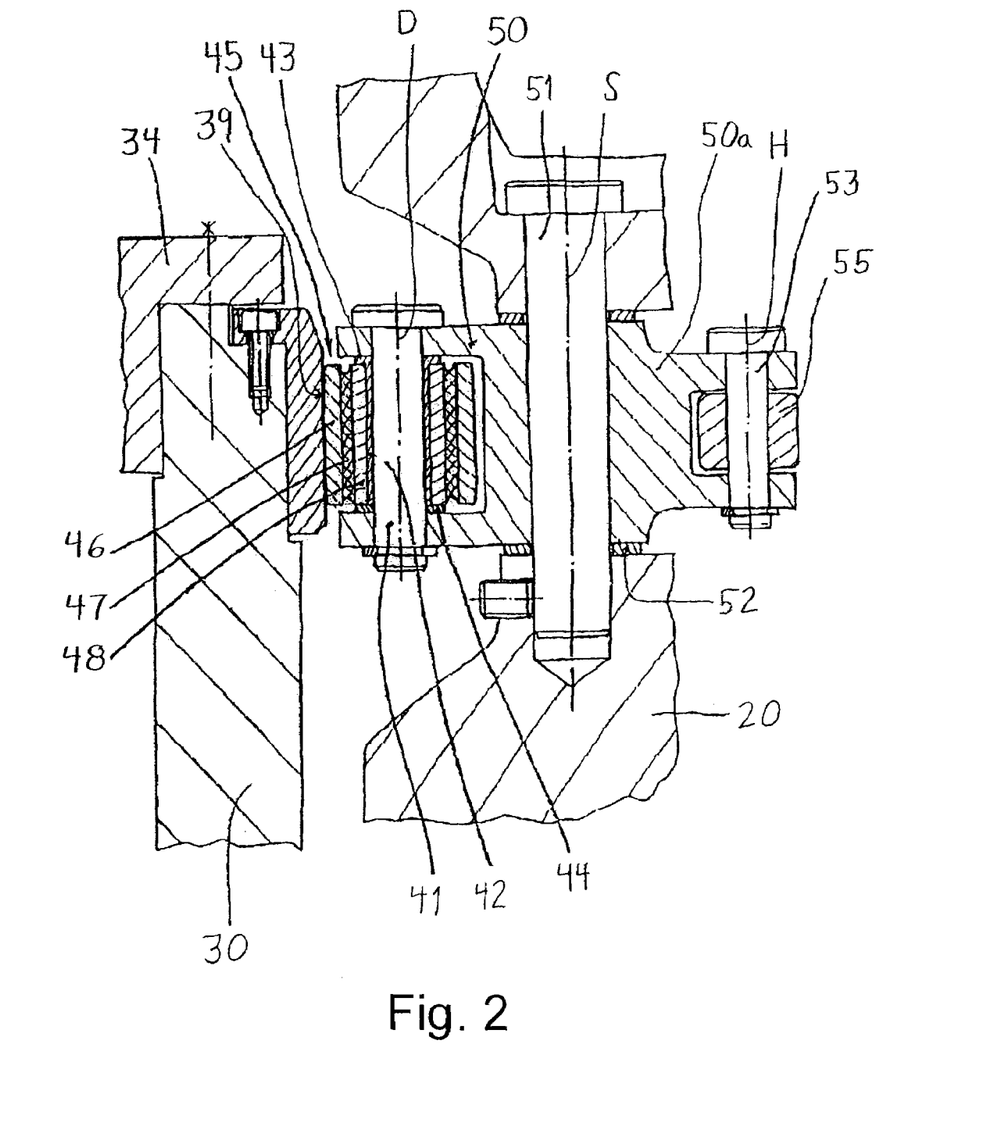
FIG. 2 a radial bearing formed with settable rollers.

FIG. 2 shows an enlarged longitudinal section of a part of the radial bearing 40 including a setting means for one of the rollers 45 of the radial bearing 40. The radial bearing 40 a number of the rollers 45, distributed about the adjusting axis A. The rollers 45 are each individually connected to the carrier structure 20 by means of an individual setting means, that is, they revolve with it during an adjusting movement of the carrier structure 20. The running path 39 for the rollers 45 is formed by an annular insert which is fastened to the support structure 30, radially opposite the rollers 45.

The rollers 45 are preferably identical to each other and arranged on the support structure 30 in the same way, such that the explanations below with respect to one of the rollers 45 also apply to the other rollers 45. The roller 45 consists of a rigid outer sleeve 46 having a hard, preferably slightly crowned running surface, a rigid inner sleeve 48 and an intermediate layer 47 which connects the sleeves 46 and 48 and is rubber-elastic and has a strong damping effect. The intermediate layer 47 is vulcanized in. The inner sleeve 48 is fastened via a bolt 41 to a pivoting arm 50, such that it can rotate about a roller rotational axis D. A sliding bush 42 is attached between the inner sleeve 48 and the bolt 41. The roller 45 is axially fixed on the bolt 41 by a sliding bush collar 43 and a sliding disc 44 arranged on the other facing side of the sliding bush 42. The collar 43 and the sliding disc 44 abut the pivoting arm.

The pivoting arm 50 is connected to the carrier structure 20 such that it can pivot about a pivoting axis S. The pivoting axis S is formed by means of a bolt 51 which is fastened to the carrier structure 20 and about which the pivoting arm 50 pivots. Along the pivoting axis S, the pivoting arm 50 is prevented or at least significantly restricted from moving axially by hardened fitting discs 52.

The pivoting arm 50 is extended beyond the pivoting axis S, pointing away from the running path 39, where it forms a lever arm 50a. A setting force required for pressing the roller 45 is introduced into the lever arm 50a, such that the pivoting arm 50 is pivoted about the pivoting axis in a direction which causes the roller 45 to be pressed onto the running path 39.

Figure 3:
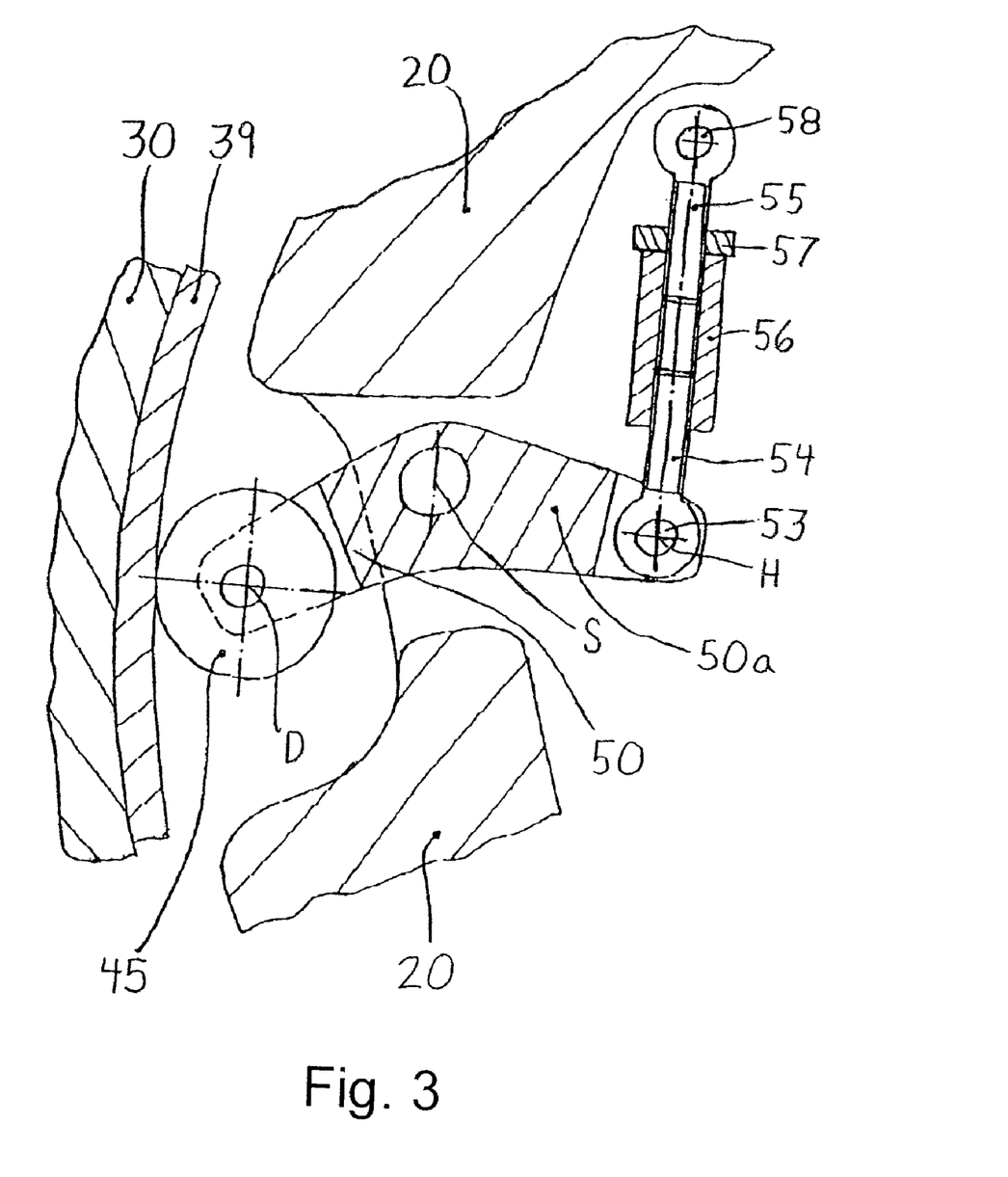
FIG. 3 a setting means of the radial bearing.

FIG. 3 shows the roller 45 and its setting means in a cross-section. The roller 45 is partly received in an indentation in the carrier structure 20. The indentation extends in the circumferential direction about the adjusting axis A, enough to enable the pivoting movement of the pivoting arm 50 and the attaching and detaching movement of the roller 45 which this causes. The setting means comprises a telescope which extends between a coupling on the carrier structure 20 and a coupling on the lever arm 50a and exhibits an adjustable length between the two couplings. The two couplings of the telescope are each formed by a rotational joint. In the exemplary embodiment, the telescope is formed by a joint head 54 comprising a left-handed thread, a joint head 55 comprising a right-handed thread and a connecting piece 56 embodied as a sleeve which is in threaded engagement with each of the two joint heads 54 and 55. The joint head 54 is connected to the lever arm 50a via a bolt 53 and the joint head 55 is connected to the carrier structure 20 via a bolt 58. By rotating the connecting piece 56, the two joint heads 54 and 55 are moved towards or away from each other along the thread axis and the telescope length is thus set. A counter piece 57—in the exemplary embodiment, a counter nut—secures the connecting piece 56 in the rotational position set. As an alternative to a mechanical setting means, the telescope 54-56 can, for example, also be replaced by a pneumatic or hydraulic unit. A mechanical setting means can be supplemented by a motor, in order to be able to perform setting automatically.

The rotational axis D of the roller 45 and the pivoting axis S point at least substantially parallel to the adjusting axis A. This preferably also applies to the lever axis H and the other joint axis of the telescope 54-56.

The carrier structure 20—including the rotor shaft 2, the complete gear system, the generator 16, 17, and the carrier structure's bearing parts of the two bearings 32 and 40—is inserted into the support structure 30 from above and lowered onto the collar 31. The carrier structure 20 is then resting in the axial bearing 32 on the support structure 30. Only the rollers 45, which are already pre-assembled, still have to be pressed onto the running path 39 with the desired pressing force. If being axially secured against lifting out is desired, then the holders 24 with the rollers 25 are also fastened to the carrier structure 20, or alternatively the rollers 25 are mounted on the holders 24 already provided. If the rollers 25 are also adjustable, these are also then set. The carrier structure 20, including the components of the plant supported by it, then rests upright on the support structure 30. Lastly, the rotor 1 is fastened to the rotor shaft 2.

Figure 4:
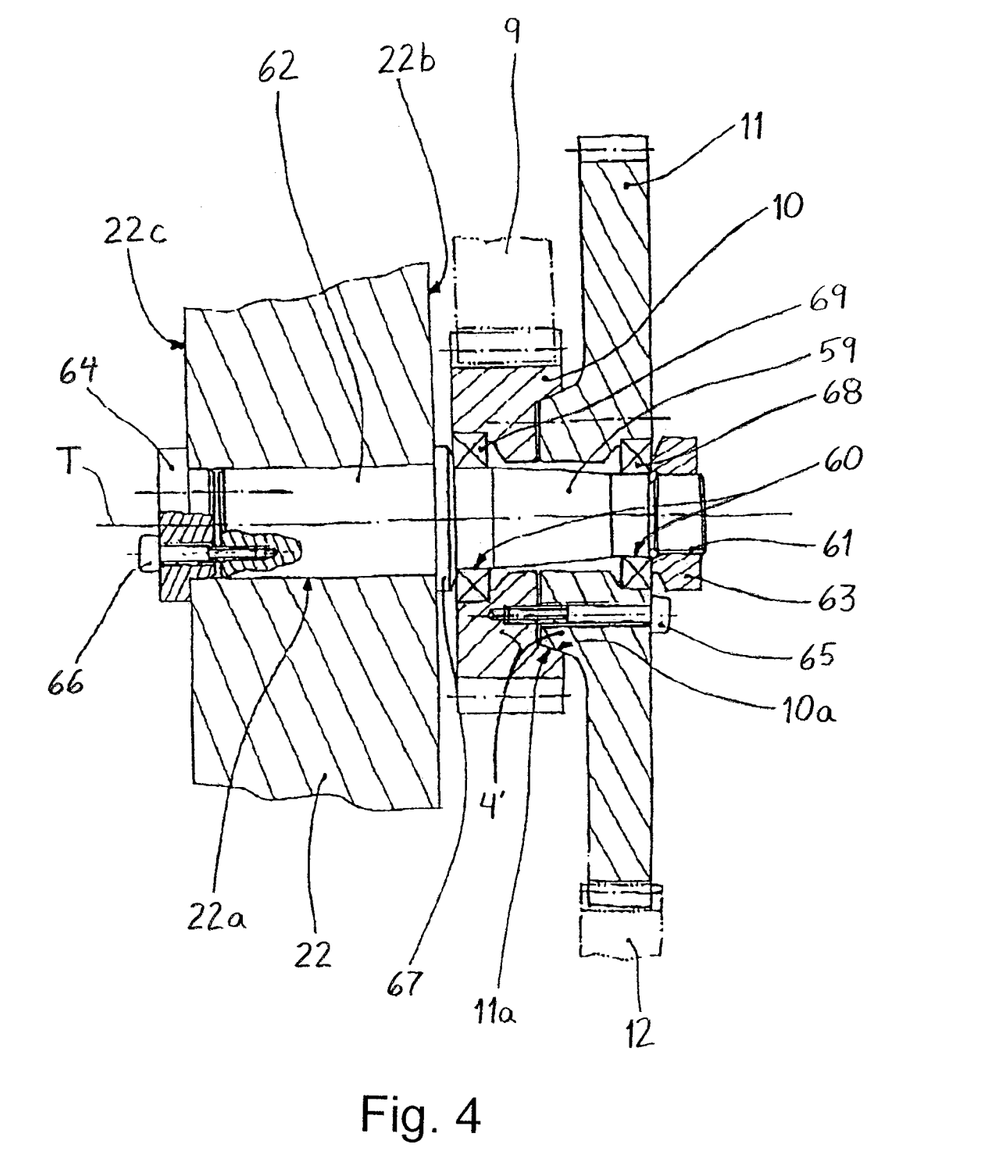
FIG. 4 a modified bearing of gear wheels.

FIG. 4 shows a modified embodiment of the bearings of the gear wheels 8-13 on the gear carrier 22, using the example of the cylindrical gears 10 and 11. The cylindrical gears 10, 11 are shown in engagement with the cylindrical gears 9 and 12 continuing the gear system.

An opening 22a, preferably cylindrical bore 22a, is introduced into the gear carrier 22, into which a congruent, in the exemplary embodiment cylindrical section 62 of a carrier trunnion 59 is inserted and thus supported on the gear carrier 22. The carrier trunnion 59 comprises a collar 67 through which it is brought into abutment during assembly with the surface 22b of the gear carrier 22 facing the cylindrical gears 10, 11. This is achieved by connecting a disc 64, a section of which abuts the surface 22c of the gear carrier 22 facing away from the cylindrical gears 10, 11, to the carrier trunnion 59—preferably parallel to the carrier trunnion axis T—using a number of screws 66. By screwing the screws 66 tight, the disc 64 and the collar 67 of the carrier trunnion 59 are drawn against the respectively abutting surfaces 22c, 22b of the gear carrier 22 and axially fixed to it.

The carrier trunnion 59 comprises bearing surfaces 60 on which bearing units 68, 69 are guided which support the cylindrical gears 10, 11 such that they can rotate about the carrier trunnion axis T. The bearing units 68, 69 are preferably embodied as roll bearings and preferably as tapered roller bearings. It is also possible to use sliding bearings or to combine sliding bearings and roll bearings. The carrier trunnion 59 comprises a thread 61 on its free end. A nut 63 is rotated onto the thread 61 and secured and determines the position along the carrier trunnion axis T of the bearing units 68, 69 on the carrier trunnion 59. If, as preferred, tapered roller bearings are used as the bearing units 68, 69, the bearing clearance of the bearing units 68, 69 is set via the nut 63.

The cylindrical gears 10, 11 are connected to each other, secure against rotation, such that torque can be transferred between them. This connection is preferably embodied as a detachable connection, since this significantly simplifies production, in particular the toothing of the smaller cylindrical gear 10 as compared to production of the toothing of cylindrical gears 10, 11 previously connected fixedly. When connecting the cylindrical gears 10, 11, the toothing circles are preferably concentrically orientated by placing an outer taper 11a of one cylindrical gear 11 against a congruent inner taper 10a of the other cylindrical gear 10. The cylindrical gears 10, 11 are drawn axially against each other by a number of screw bolts 65. In a preferred embodiment, the inner taper 10a and the outer taper 11a are thus moved into a frictional lock which can transfer the torque from one cylindrical gear 10 onto the other cylindrical gear 11. Alternatively, transferring the torque by connecting the cylindrical gears 10, 11 using fitting bolts or other suitable elements is conceivable. The cylindrical gears 10 and 11 together form a gear shaft 4'.

For simplicity, a seal between the bearing units 68, 69 and the cylindrical gears 10 and 11 is not shown. Functionally, it is preferably arranged between sections of the cylindrical gears 10, 11 and the carrier trunnion 59.

A representation of a lubricating system of the bearing units 68, 69 has likewise been omitted. Such lubrication can, for example, be provided using circulatory lubrication, to which end the carrier trunnion 59 is provided at its free end with bores which transport the lubricant to the bearing units 68, 69 and away from them.

Once the nut 63 has been released, the entire unit consisting of the cylindrical gears 10, 11 and the bearing units 68, 69 can be removed from the carrier trunnion 59. Analogously, this unit is assembled in the reverse order. This is advantageous when assembling the device for the first time, and in particular when repairing the device mounted at the site of operation.

The arrangement of the bearing of the cylindrical gears 10, 11 on a trunnion 59, can be applied to any of the gear wheels 8-13 of the gear shafts 3, 4, and 5.

Another advantage of the bearing by means of carrier trunnions is the lower labor costs in producing the carrier unit, in particular the gear carrier 22, as compared to the bearings of the gear shafts 3, 4, and 5 shown in FIG. 1. In the bearing shown in FIG. 1, the bearing seats of the shaft bearings 3a, 4a, and 5a have to be introduced into the gear carrier 22, which requires more elaborate machining of the gear carrier 22. By comparison, the bearing described in FIG. 4 only requires that preferably cylindrical bores 22a be introduced into the gear carrier 22.

Figure 5:
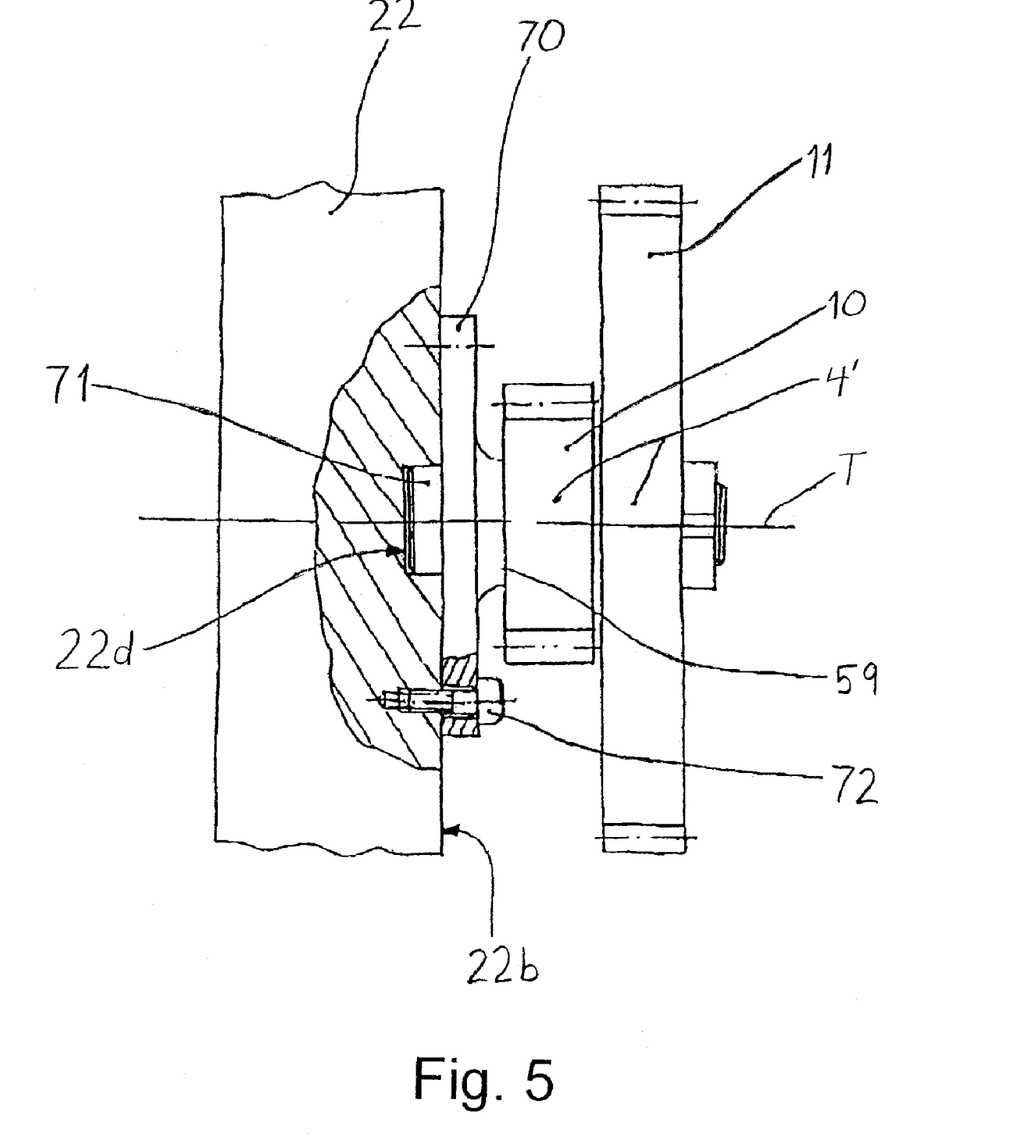
FIG. 5 another modified bearing of the gear wheels.

FIG. 5 shows a particularly advantageous embodiment of the carrier axis T for supporting the gear wheels on the gear carrier 22, also using the example of the cylindrical gears 10, 11. Preferably, the cylindrical gears 10, 11 and the bearing of the cylindrical gears 10, 11 on the carrier trunnion 59 are designed, and the bearing units 68, 69 sealed and lubricated, as stated with respect to FIG. 4.

On its side facing the gear carrier 22, the carrier trunnion 59 comprises a flange 70 through which it is fastened to the surface 22b of the gear carrier 22 by a number of screws 72. All the tilting moments about axes which are orientated orthogonal to the carrier trunnion axis T are introduced into the gear carrier 22 from the carrier trunnion 59 by the flange 70. In order to accurately position the carrier trunnion 59 on the gear carrier 22, the flange 70 comprises a guiding trunnion 71 on its side facing the gear carrier 22, the guiding trunnion 71 protruding into a corresponding recess 22d of the gear carrier 22. Preferably, the guiding trunnion 71 is embodied as a cylinder and the recess 22d as a congruent cylindrical bore.

The embodiment of the carrier trunnion 59 shown reduces the costs in generating the connection geometries on the gear carrier 22, as compared to the exemplary embodiments cited previously. The assembly costs are further reduced, and if it becomes necessary to exchange the carrier trunnion 59 in the device situated at the site of operation, this can be done from one side of the gear carrier 22. The entire unit consisting of the carrier trunnion 59 and the cylindrical gears 10, 11 can be mounted and/or dismantled, once the screws 72 have been released. This simplifies both repairing the device and assembling the device for the first time.

The bearing described on the basis of the gear wheels 10 and 11 can be used for all the gear wheels of the gear shafts 3, 4, and 5.

It is also possible to provide, in combination, shaft bearings in receptacles of the carrier structure and shaft bearings on carrier trunnions of the carrier structure.

Figure 6:
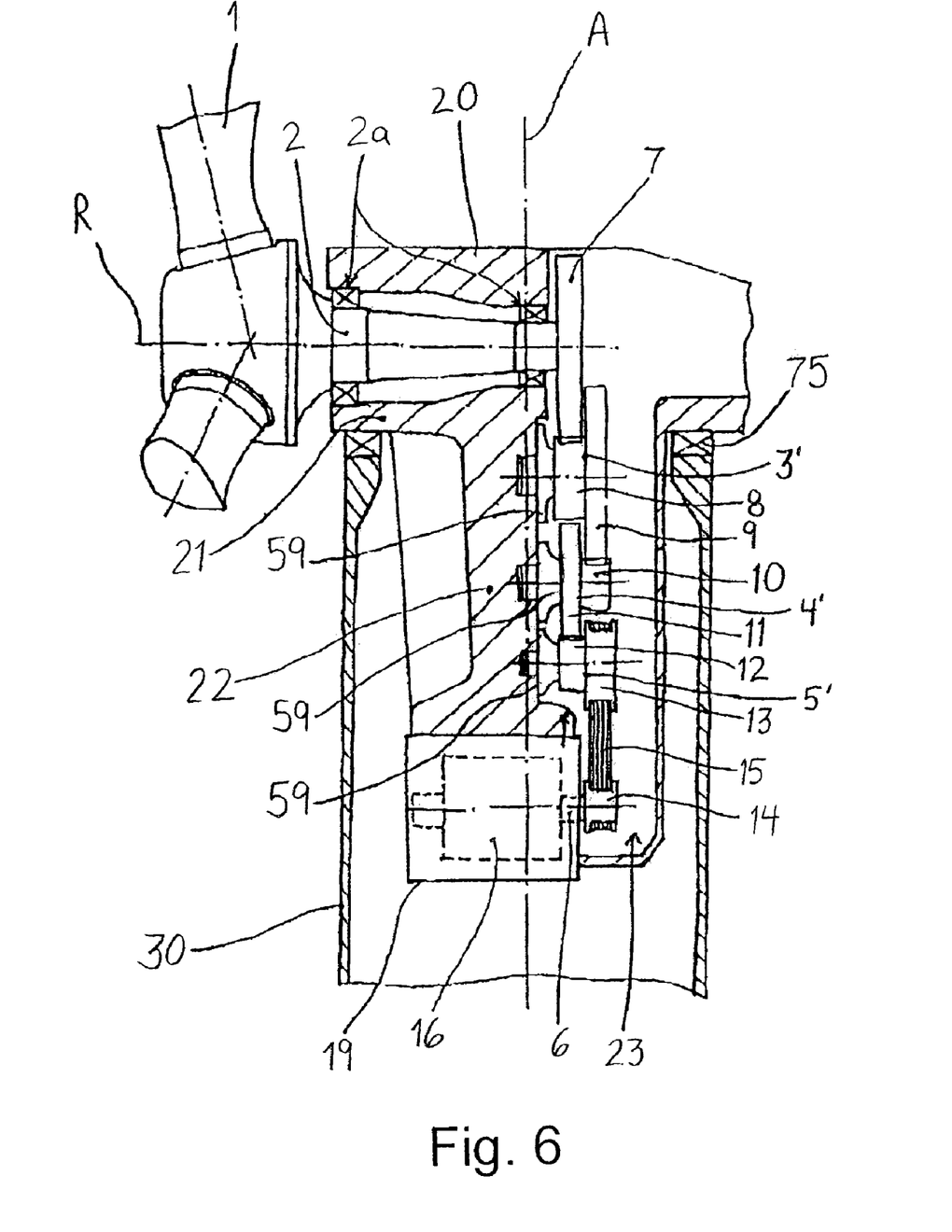
FIG. 6 a second embodiment of a device in accordance with the invention, using the example of a wind energy plant.

FIG. 6 shows a second embodiment of a device for converting wind energy into electrical energy. Where no differences are described, the second embodiment corresponds to the first.

The carrier structure 20 of the second embodiment again comprises an integrated carrier unit which supports the rotor shaft 2 and all the gear shafts 3', 4' and 5', wherein the gear shafts 3' to 5' are each rotatably supported on a respective carrier trunnion 59 described on the basis of FIG. 5. The carrier unit accordingly forms the joint element 21 and the gear carrier 22 in the integrated form described. For the generator 16, by contrast, a generator housing 19 is provided which forms the generator bearing for the generator shaft 6.

The generator housing 19 is fastened to a lower side of the carrier unit and together with the carrier unit forms the carrier structure 20.

The adjusting bearing of the second embodiment is a combined axial/radial bearing 75. It is formed as a roll bearing, the roll bodies of which are not guided and held individually, but conventionally between running paths facing opposite each other, and roll off on the running paths during an adjusting movement of the carrier structure 20 about the adjusting axis A. At least one of the running paths is fastened to the support structure 30 and another of the running paths is fastened to the carrier structure 20 each, for example, by means of a screw flange connection.

The joint element 21 forms a collar through which the carrier structure 20 sits on the adjusting bearing 75. The gear carrier 22 projects vertically downwards from the joint element 21. In the second embodiment, all the gear shafts 3' to 5' and also again the generator shaft 6 are arranged beneath the combined adjusting bearing 75, such that the operating forces acting on the adjusting bearing 75 are compensated for as well as possible by a counteracting moment.

Figure 7:
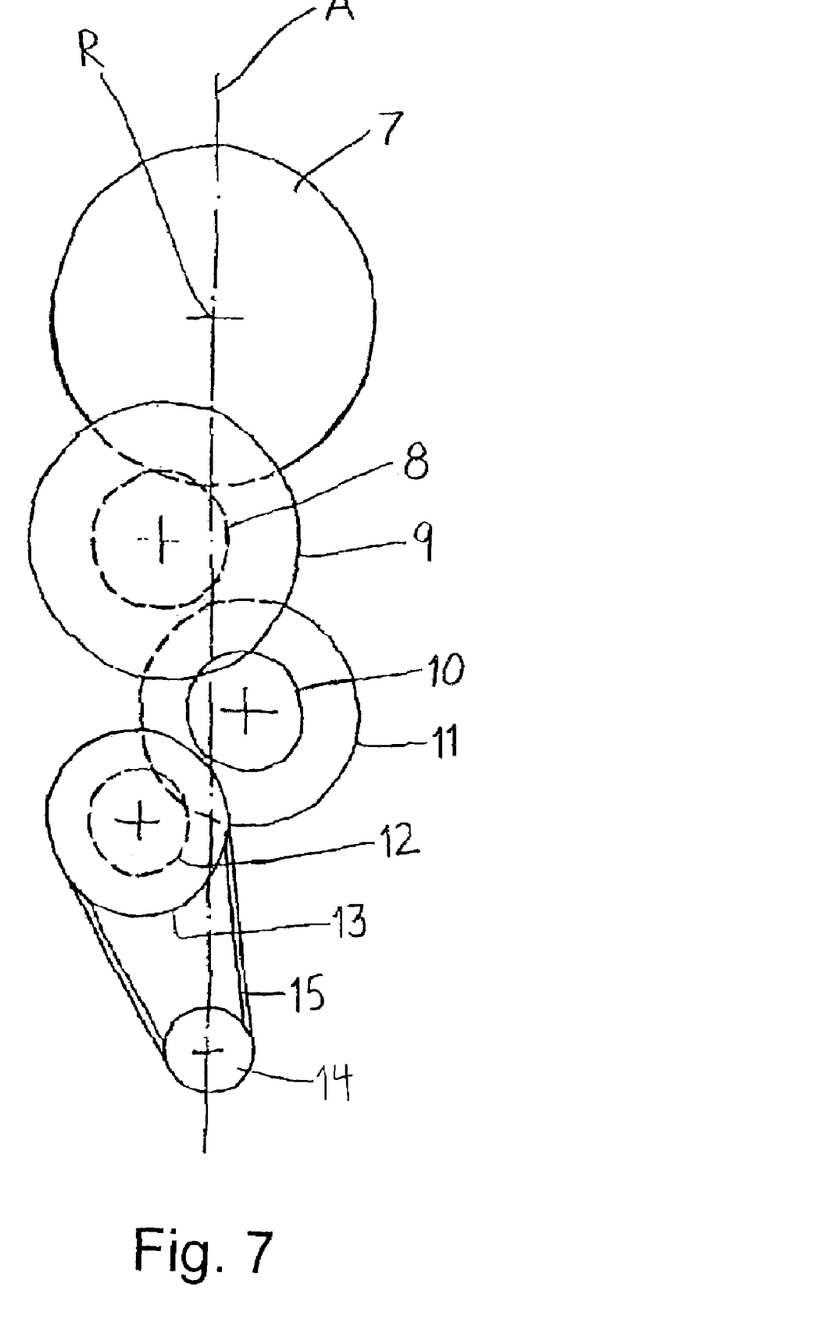
FIG. 7 a view onto the gear wheels.

FIG. 7 shows the cylindrical gear system in a top view parallel to the rotor axis R. All the pairs of gears, each consisting of a drive gear and an output gear directly driven by it, for example, the gear wheels 7 and 8 and the gear wheels 13 and 14, are arranged mutually external one to the other. The rotational axes of the gear wheels 7 to 14 are offset transversely to each other in each case; in the exemplary embodiment, the rotational axes are exactly parallel to each other. The gear wheels 7 to 14 form a set of gears along the adjusting axis A. The gear wheels 7 to 14 are here arranged offset with respect to the adjusting axis A, that is, some of the gear wheels 7 to 14 are arranged at a distance from the adjusting axis A to one side of the adjusting axis A, in the top view, and another part of the gear wheels 7-14 is also arranged at a distance from the adjusting axis A to the other side of the adjusting axis A. Overall, this results in a zigzag course in the set of gear wheels 7 to 14, whereby constructional height can be saved as compared with an arrangement exactly on a straight line, for example, exactly on the adjusting axis A.

REFERENCE NUMERALS 1 rotor
2 rotor shaft
2a rotor bearing
3 gear shaft
3' gear shaft
3a gear bearing
4 gear shaft
4' gear shaft
4a gear bearing
5 gear shaft
5' gear shaft
5a gear bearing
6 generator shaft
6a generator bearing
7 cylindrical gear
8 cylindrical gear
9 cylindrical gear
10 cylindrical gear
11 cylindrical gear
12 cylindrical gear
13 cylindrical gear
14 cylindrical gear
15 belt
16 generator rotor 17 generator stator
18 current collector
19 generator housing
20 carrier structure
21 joint element
22 gear carrier
22a opening, bore
22b surface
22c surface
22d recess
23 gear space
24 holder
25 roll body, roller
26 insert
27 adjusting motor
28 toothed gear
29 side projection
30 support structure
31 collar
32 axial bearing
33 running path
34 toothed ring
35 cooling means
36 electrical parts
37 control means
38 hoist
39 running path
40 adjusting bearing, radial bearing
41 bolt
42 sliding bush
43 collar
44 sliding disc
45 roll body, roller
46 outer sleeve
47 intermediate layer
48 inner sleeve
49 —
50 pivoting arm, rocker
50a lever arm
51 bolt
52 fitting ring
53 bolt
54 joint head
55 joint head
56 connecting piece
57 counter piece
58 bolt
59 carrier trunnion
60 bearing surface
61 thread
62 cylindrical section
63 nut
64 disc
65 screw bolt
66 screw
67 collar
68 bearing unit
69 bearing unit
70 flange
71 guiding trunnion
72 screw
73 —
74 —
75 adjusting bearing, axial/radial bearing
R rotor axis
A adjusting axis
D roller rotational axis
S pivoting axis
H lever axis

The invention claimed is:

1. A device for converting flow energy of a fluid into electrical energy, said device comprising:
 a) a rotor which can be driven by the fluid and comprises a rotor shaft,
 b) an electric generator comprising a generator shaft,
 c) a gear system comprising a gear shaft for transferring a rotational movement of the rotor shaft to the generator shaft,
 d) a support structure,
 e) a carrier structure which forms a rotor bearing for the rotor shaft, a gear bearing for the gear shaft and a generator bearing for the generator shaft;
 f) and an adjusting bearing, including at least one bearing member, the at least one bearing member is positioned between and bearingly engaging the support structure and the carrier structure such that the adjusting bearing adjustably bears the carrier structure relative to the support structure;
 g) wherein at least one of the gear shaft and the generator shaft is arranged lower than an uppermost bearing member of the adjusting bearing.

2. The device as set forth in claim 1, wherein the gear shaft is offset transversely to the rotor shaft.

3. The device as set forth in any claim 1, wherein the rotor shaft drives the gear shaft by means of cylindrical gears, each arranged external to its respective meshing partner.

4. The device as set forth in claim 1, wherein the rotor shaft and the gear shaft are arranged side by side along an axis pointing transversely with respect to the rotor shaft.

5. The device as set forth in claim 1, wherein the gear shaft and the generator shaft are arranged side by side along an axis pointing transversely with respect to the rotor shaft.

6. The device as set forth in claim 1, wherein the generator shaft is offset transversely to the gear shaft.

7. The device as set forth in claim 1, wherein the gear shaft drives the generator shaft by means of cylindrical gears, each arranged external to its respective meshing partner.

8. The device as set forth in claim 1, wherein the gear shaft comprises two cylindrical gears arranged axially adjacently, wherein the rotor shaft drives one of the cylindrical gears, and wherein the other drives off to the generator shaft.

9. The device as set forth in claim 1, wherein the gear system comprises a number of gear shafts which are supported by the carrier structure and arranged lower than the uppermost bearing member of the adjusting bearing.

10. The device as set forth in claim 1, wherein the gear system comprises a number of gear shafts and the rotor shaft drives the gear shafts by means of cylindrical gears, each arranged external to its respective meshing partner.

11. The device as set forth in claim 1, wherein the gear system for transferring the rotational movement comprises cylindrical gears which are in engagement with each other in pairs.

12. The device as set forth in claim 1, wherein the gear system for transferring the rotational movement comprises a belt or chain drive comprising at least one belt or chain, and two cylindrical gears coupled by the at least one belt or chain.

13. The device as set forth in claim 1, wherein the gear system is a cylindrical gear system.

14. The device as set forth in claim 1, wherein the gear system comprises gear wheels which transfer the rotational movement of the rotor onto the generator, and wherein the carrier structure forms a gear space in which at least part of the gear wheels are arranged.

15. The device as set forth in claim 14, wherein the gear wheels can be exchanged via the gear space.

16. The device as set forth in claim 14, wherein the gear shaft can be exchanged via the gear space.

17. The device as set forth in claim 1, wherein all the gear wheels of the gear system which transfer the rotational movement of the rotor onto the generator are arranged on the same side of the gear system.

18. The device as set forth in claim 1, wherein the gear bearing is fluidically separated from the gear wheels of the gear system by a suitable configuration of the device.

19. The device as set forth in claim 1, wherein the rotor in the adjusting bearing can be adjusted about an adjusting axis pointing transversely to the rotor shaft.

20. The device as set forth in claim 19, wherein the adjusting bearing is a radial bearing which is formed about the adjusting axis and supports an operating force of the device acting radially with respect to the adjusting axis, and wherein the weight of the carrier structure is supported in an axial bearing formed about the adjusting axis.

21. The device as set forth in claim 20, wherein at least one of the gear shaft and the generator shaft is arranged higher than the axial bearing.

22. The device as set forth in claim 20, wherein at least one of the gear shaft and the generator shaft is arranged lower than the axial bearing.

23. The device as set forth in claim 19, wherein the adjusting bearing is a combined axial-radial bearing which is formed about the adjusting axis and supports an operating force of the device acting radially with respect to the adjusting axis and supports the weight of the carrier structure.

24. The device as set forth in claim 1, wherein a damping is formed to reduce the transfer of structure-borne noise between the support structure and the carrier structure.

25. The device as set forth in claim 1, wherein a number of roll bodies and at least one running path for the roll bodies form a bearing for the carrier structure, one of the carrier structure and the support structure forming the at least one running path and the roll bodies being attached to the other.

26. The device as set forth in claim 25, wherein the roll bodies are provided with an elastic damping.

27. The device as set forth in claim 25, wherein the positions of the roll bodies relative to the at least one running path can be adjusted and the roll bodies can thus be moved into contact with the at least one running path and/or moved away from the running path.

28. The device as set forth in claim 27, wherein the roll bodies are connected to one of the carrier structure and the support structure, such that each can be pivoted via a pivoting arm.

29. The device as set forth in claim 28, wherein a rocker or an eccentric forms the pivoting arm.

30. The device as set forth in claim 1, wherein the adjusting bearing is formed by means of at least one sliding bearing or at least one roll bearing, the at least one roll bearing comprising running paths and roll bodies which roll off on the running paths and are guided by the running paths.

31. The device as set forth in claim 1, wherein a bearing formed by a number of roll bodies and at least one running path secures the carrier structure against moving counter to the weight force.

32. The device as set forth in claim 1, wherein at least one of the rotor bearing, gear bearing and the generator bearing is formed as a shaft bearing in a receptacle of the carrier structure.

33. The device as set forth in claim 32, wherein the receptacle is provided individually for the at least one of the rotor bearing, gear bearing and the generator bearing.

34. The device as set forth in claim 32, wherein the receptacle protrudes through the carrier structure.

35. The device as set forth in claim 1, wherein a carrier trunnion of the carrier structure forms at least one of the rotor bearing, the gear bearing and the generator bearing.

36. The device as set forth in claim 35, wherein the carrier trunnion is detachably connected to a carrier block of the carrier structure.

37. The device as set forth in claim 1, wherein the carrier structure forms a joint element of an adjusting joint formed with the support structure, and wherein the carrier structure comprises a carrier unit which is formed in one piece or pre-jointed from parts which are fixedly connected to each other.

38. The device as set forth in claim 37, wherein the carrier unit forms the gear bearing.

39. The device as set forth in claim 37, wherein the carrier unit forms the rotor bearing.

40. The device as set forth in claim 37, wherein the carrier unit forms the joint element.

41. The device as set forth in claim 37, wherein the carrier unit forms the generator bearing.

42. The device as set forth in claim 37, wherein at least one other of the gear bearing, the rotor bearing and the generator bearing is formed by a separate bearing housing fixedly connected to the carrier unit.

43. The device as set forth in claim 1, wherein the rotor is a wind rotor.

44. The device as set forth in claim 43, further comprising a tower protruding up from a foundation, wherein the support structure is fixedly connected to the tower.

45. The device as set forth in claim 1, wherein the device is a tidal power station and the rotor is a water turbine.

* * * * *